(12) United States Patent
Takaki

(10) Patent No.: US 9,729,083 B2
(45) Date of Patent: Aug. 8, 2017

(54) POWER SUPPLY SYSTEM AND POWER SOURCE APPARATUS

(71) Applicant: Sony Corporation, Tokyo (JP)

(72) Inventor: Kazutaka Takaki, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/373,431

(22) PCT Filed: Jan. 25, 2013

(86) PCT No.: PCT/JP2013/052290
§ 371 (c)(1),
(2) Date: Jul. 21, 2014

(87) PCT Pub. No.: WO2013/115343
PCT Pub. Date: Aug. 8, 2013

(65) Prior Publication Data
US 2015/0009733 A1    Jan. 8, 2015

(30) Foreign Application Priority Data

Feb. 1, 2012   (JP) .................................. 2012-020259

(51) Int. Cl.
| | |
|---|---|
| H02M 1/00 | (2006.01) |
| H02M 7/537 | (2006.01) |
| H02J 3/38 | (2006.01) |
| G05F 1/67 | (2006.01) |

(52) U.S. Cl.
CPC .............. *H02M 7/537* (2013.01); *G05F 1/67* (2013.01); *H02J 3/385* (2013.01)

(58) Field of Classification Search
CPC ........... H02M 2001/0012; H02M 7/537; H02J 3/382; H02J 3/383; H02J 3/385; G05F 1/66
USPC ........... 363/34, 37, 108, 109, 111, 121, 131; 323/273, 275, 277, 280
See application file for complete search history.

(56) References Cited

U.S. PATENT DOCUMENTS 6,369,461 B1 *  4/2002  Jungreis et al. ................. 307/46
7,158,395 B2 *  1/2007  Deng ......................... G05F 1/67
                                                           363/95

(Continued)

FOREIGN PATENT DOCUMENTS

| EP | 2362517 A2 | 8/2011 |
|---|---|---|
| IT | T02010A000661 | 1/2012 |

(Continued)

OTHER PUBLICATIONS

Yamaguchi Masahide, Power Conditioner for Solar Energy Generation, Dec. 6, 2002.*

(Continued)

*Primary Examiner* — Adolf Berhane
*Assistant Examiner* — Sisay G Tiku
(74) *Attorney, Agent, or Firm* — Chip Law Group

(57) ABSTRACT

A power supply system that comprises an electrical storage device; a power conversion circuit configured to convert a power from the electrical storage device into converted DC power; and a power control unit configured to receive the converted DC power and output AC power. The converted DC power is controlled such that the output AC power is a predetermined AC power.

20 Claims, 11 Drawing Sheets

(56) References Cited

U.S. PATENT DOCUMENTS

| | | | | |
|---|---|---|---|---|
| 2004/0207366 A1* | 10/2004 | Sung | .................. | H02J 7/35 |
| | | | | 320/140 |
| 2007/0035975 A1* | 2/2007 | Dickerson | ................. | H02J 7/35 |
| | | | | 363/131 |
| 2010/0091532 A1 | 4/2010 | Fornage | | |
| 2011/0128760 A1* | 6/2011 | Yuan | ....................... | H02J 3/385 |
| | | | | 363/50 |
| 2011/0210694 A1* | 9/2011 | Uehashi et al. | ............. | 320/101 |
| 2012/0314467 A1* | 12/2012 | O'Brien | ................. | H02J 3/383 |
| | | | | 363/131 |
| 2013/0027997 A1* | 1/2013 | Tan | ........................ | G05F 1/67 |
| | | | | 363/95 |
| 2013/0134786 A1* | 5/2013 | Ishigaki | ............... | H02M 3/158 |
| | | | | 307/71 |

FOREIGN PATENT DOCUMENTS

| | | |
|---|---|---|
| JP | 06-332553 | 2/1994 |
| WO | 02/21659 A1 | 3/2002 |
| WO | 2012014182 | 2/2012 |

OTHER PUBLICATIONS

International Search Report issued in connection with International Application No. PCT/JP2013/052290, dated May 16, 2014. (5 pages).

Esram T et al: "Comparison of Photovoltaic Array Maximum Power Point Tracking Techniques", IEEE Transactions on Energy Conversion, IEEE Service Center, Piscataway, NJ, US, vol. 22, No. 2, Jun. 2, 2007, pp. 439-449. (11 pages).

Office Action for EP Patent Application No. 13707456.3, dated Mar. 13, 2017, 06 pages.

* cited by examiner

US 9,729,083 B2

POWER SUPPLY SYSTEM AND POWER SOURCE APPARATUS

CROSS REFERENCES TO RELATED APPLICATIONS

The present application is a national stage of International Application No. PCT/JP2013/052290 filed on Jan. 25, 2013 and claims priority to Japanese Patent Application No. 2012-020259 filed on Feb. 1, 2012, the disclosure of which is incorporated herein by reference.

BACKGROUND

The present disclosure relates to a power supply system and a power source apparatus.

Recently, research and development on the use of renewable energy have been popular in a bid to escape from the dependence on fossil fuel. As power generation which uses renewable energy, photovoltaic power generation, wind power generation, fuel cells, biomass power generation, wave power generation, and the like have been developed. When renewable energy is used, there are problems in that the amount of power generation varies according to natural conditions, and that excesses and deficiencies occur in the amount of power consumption. For example, although the amount of domestic power consumption is large at a specific time slot of a day, it is not limited that the time slot is coincide with a time slot that the amount of power generation is large.

In order to solve this problem, it is conceivable that a storage battery system be introduced to each house, output of photovoltaic power generation or the like is once accumulated in the storage battery system, and the output of the storage battery system is used according to consumption. In detail, the output of the storage battery system is caused to flow into a system at a time slot that is peak of the power consumption such that power is flatten out, a time shift is performed in which power is stored at a cheap time slot and discharged or consumed at an expensive time slot, or redundant power, which is generated using a power generating device, such as solar cells or the like, is stored in the storage battery system.

A system, which integrates power generation, power transformation, power transmission, and power distribution in order to supply power to the electric power receiving facilities of a customer, is called a power system (or a system). The electrical power that flows from the side of the customer into the power system is called "reverse power flow", and the flow from the side of the customer into the power system is called "regeneration". For example, power generated using a photovoltaic power generation system is supplied to an electrical power company. In this case, a power conditioner is arranged between the photovoltaic power generation system and the power system. The power conditioner converts the unstable Direct Current (DC) output voltage of the solar cells into a stable DC voltage, and further converts the DC voltage into an Alternating Current (AC) voltage. The power conditioner tracks the variation in power which is generated using the solar cells, and usually performs Maximum Power Point Tracking (MPPT) control.

In a power system in which both the solar cells and the storage battery system are used, the storage battery system is connected to the power conditioner. In such a configuration, the entire DC power of the storage battery system is converted into AC power using the power conditioner, and the resulting AC power is output.

A power conditioner in the related art causes interconnection to be released at a time point that an output voltage is a value which is not included in a prescribed range, that is, when feeding abnormalities occur. PTL 1 discloses a technology that prevents the interconnection from being frequently released. That is, a voltage (output voltage) at an interconnection connection point is observed and, when the output voltage approaches an upper limit voltage, setting is made such that the operating point of output current moves away from a maximum power point.

CITATION LIST

Patent Literature

PTL 1: Japanese Unexamined Patent Application Publication No. 6-332553

SUMMARY

Technical Problem

PTL 1 is intended to suppress the release of interconnection due to the occurrence of feeding abnormalities, thereby intentionally performing control such that the operating point is moved away from the maximum power point. In the related-art system according to PTL 1, maximum power is regenerated within a range in which feeding abnormalities do not occur. In an aspect of photovoltaic power generation (power selling), there is little problem. However, it is unsuitable for planned energy use which is the object of an electrical storage device. In addition, it is necessary to change the power conditioner itself, thus there is a problem of the lack of general-purpose properties.

Furthermore, power which is necessary for a system is not uniform, and it is preferable that, power be output from the power conditioner according to the power which is necessary for the system in order to prevent the battery of the storage battery system from being exhausted. In addition, when the output power of the power conditioner is regenerated for the system, it is necessary that the regenerated power is controlled in order to stabilize the system. In addition, it is preferable that power can be controlled without changing the configuration of a commercial power conditioner in practical application.

Therefore, an object of the present disclosure is to provide a power supply system and a power source apparatus which can perform control such that an output AC power is a set value.

Solution to Problem

In order to solve the above-described problems, the present disclosure provides a power supply system comprising: an electrical storage device; a power conversion circuit configured to convert a power from the electrical storage device into converted DC power; and a power control unit configured to receive the converted DC power and output AC power, wherein the converted DC power is controlled such that the output AC power is a predetermined AC power.

The present disclosure also provides a power source apparatus comprising: an electrical storage device; and a power conversion circuit configured to convert a power from the electrical storage device into converted DC power, and configured to supply the converted DC power to a power control unit that outputs AC power, wherein the converted DC power is controlled such that the output AC power is a predetermined AC power.

Advantageous Effects of Invention

The present disclosure can perform control such that output power from the electrical storage device is an appropriate value, and can prevent power to be supplied to the system from being excessive and the electrical storage device from being wastefully consumed. In addition, an existing typical configuration can be used as the power conditioner which functions as a power control unit, and the output configuration power of the power conditioner can be controlled using a set value.

Additional features and advantages are described herein, and will be apparent from the following Detailed Description and the figures.

DETAILED DESCRIPTION

Figure 1:
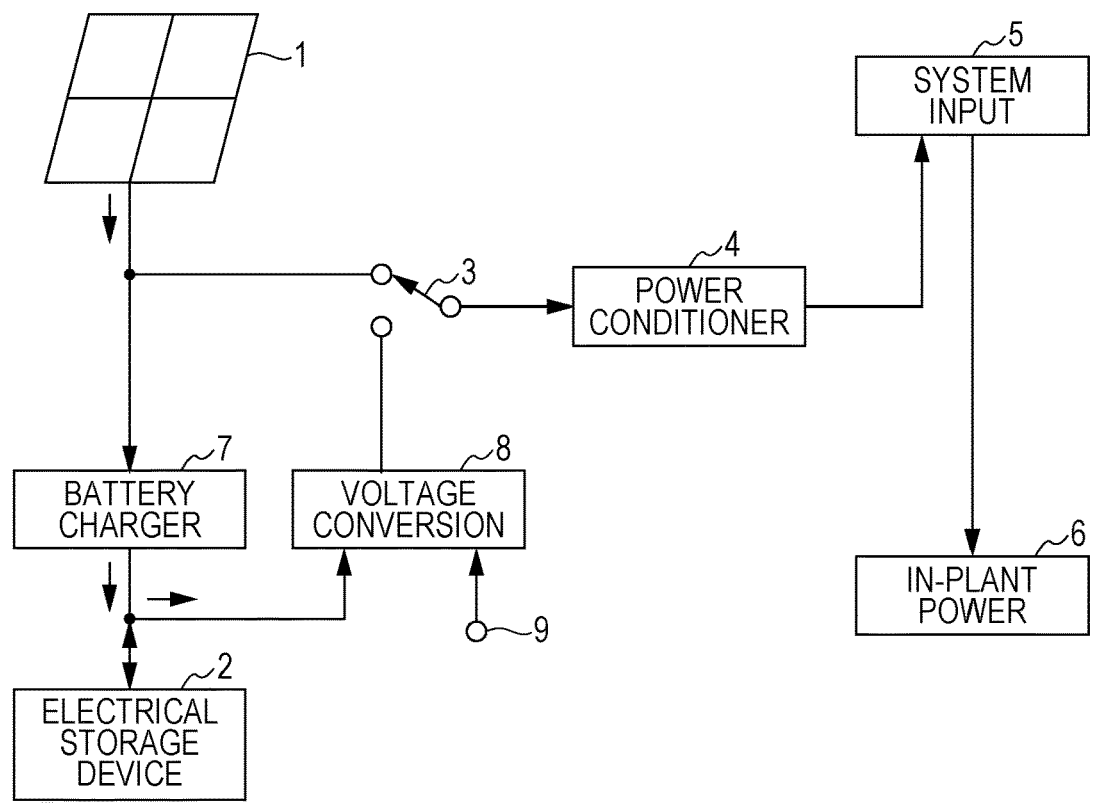
FIG. 1 is a block diagram illustrating an example of a power system to which the present disclosure can be applied.

Embodiments which are described below are the preferred detailed examples of the present disclosure, and various types of technically suitable limitations are given thereto. However, the range of the present disclosure is not limited to the embodiments in the description below unless the gist of the description particularly limits the present disclosure.
Example of Power Supply System An example of a power supply system according to the present disclosure will be described with reference to FIG. 1. The system includes solar cells 1 and an electrical storage device 2. The solar cells 1 convert solar light energy into electrical energy. The solar cells 1 are configured in such a way that a plurality of pieces of string are configured by connecting in series a plurality of modules, each obtained by connecting a plurality of solar battery cells in series, and that the plurality of pieces of string which are connected in parallel are used in units of an array.

The electrical storage device 2 uses a plurality of electrical storage elements, for example, battery cells in order to generate significant power. The battery cells are divided into a plurality of electrical storage units, and a control device is commonly provided to the plurality of electrical storage units. An electrical storage element, such as a capacitor or the like, may be used as the electrical storage elements instead of a secondary battery, such as a lithium-ion secondary battery or the like.

The generated power output (DC voltage) of the solar cells 1 is supplied to a power conditioner 4, which functions as a power control unit, and supplied to a battery charger 7 through a switch circuit 3. The output AC power of the power conditioner 4 is supplied to a system input 5. Although not shown in the drawing, power distribution paths from an electrical power company are connected to the system input 5. In addition, the AC power from the system input 5 is used as in-plant power 6. An example of the in-plant power 6 is domestic power.

The battery charger 7 charges the electrical storage device 2 based on the output of the solar cells 1. A unit which performs control called Maximum Power Point Tracking (MPPT) control may be used as the battery charger 7, like the power conditioner 4. Meanwhile, the electrical storage device 2 may be charged with not only the output of the solar cells 1, but also the in-plant power 6. The output of the electrical storage device 2 is supplied to a voltage conversion circuit 8, which functions as a conversion unit, and the output of the voltage conversion circuit 8 is supplied to the power conditioner 4 via the switch circuit 3.

The voltage conversion circuit 8 converts the DC voltage from the electrical storage device 2 into different DC voltage. A control signal from a terminal 9 is supplied to the voltage conversion circuit 8. The control signal is a signal used to control the DC output of the voltage conversion circuit 8 such that the AC power which is output from the power conditioner 4 is a predetermined AC power.

The switch circuit 3 is switched in response to a control signal from a control signal generation unit which is not shown. For example, when the power generation capacity of the solar cells 1 is not sufficient at a time slot in which the power consumption of the power system increases, the switch circuit 3 selects the output of the electrical storage device 2 (voltage conversion circuit 8). Meanwhile, instead of the switch circuit 3, the output of the solar cells 1 may be added to (combined with) the output of the electrical storage device 2 (voltage conversion circuit 8).

Figure 2:
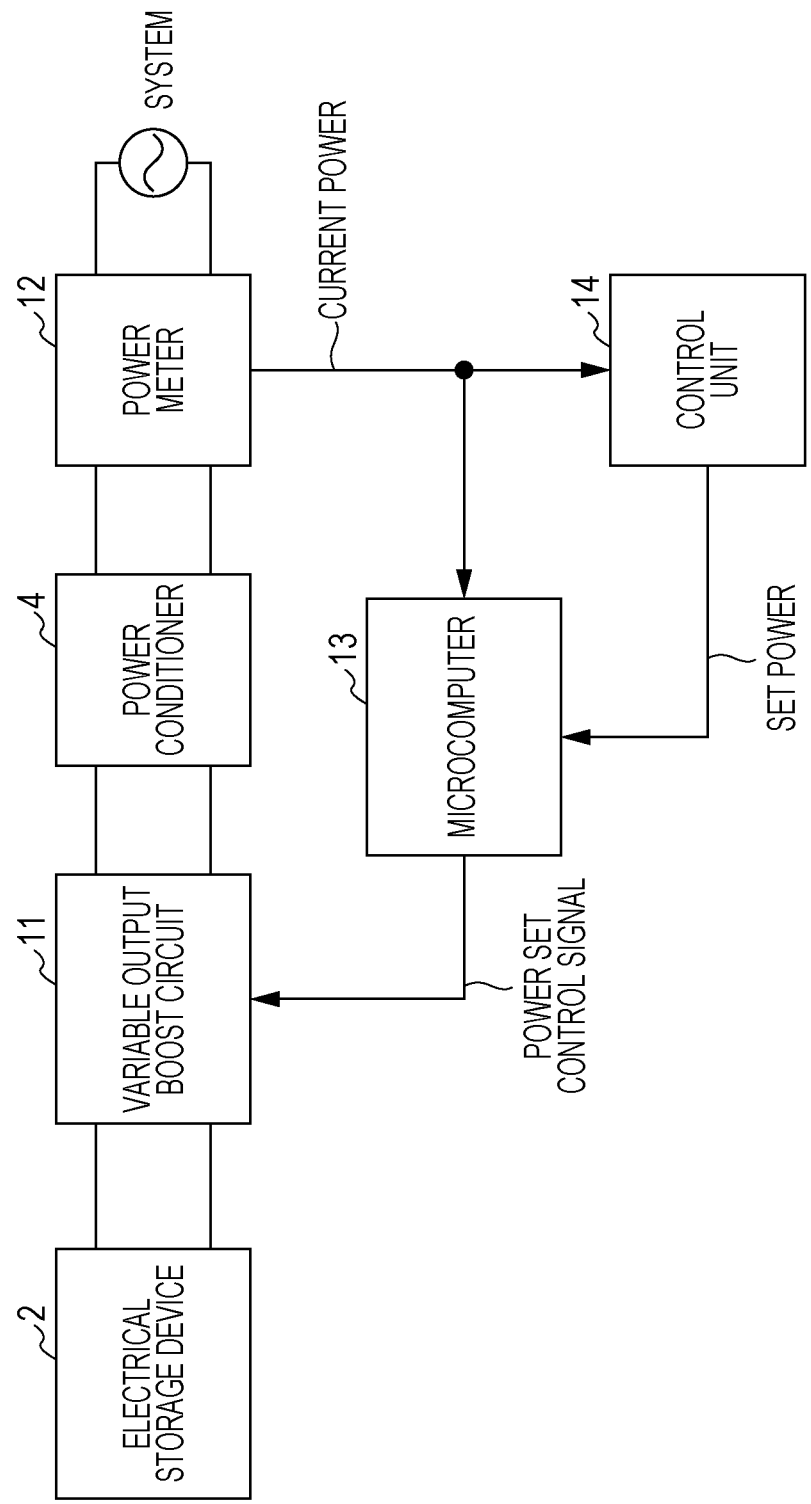
FIG. 2 is a block diagram illustrating a first example of a power supply system of the present disclosure.

The power conditioner 4 includes a power conversion unit which has a DC-DC converter unit and a DC-AC inverter unit. The DC-DC converter unit boosts an input DC voltage, and supplies the resulting voltage to the DC-AC inverter unit. The DC-AC inverter unit converts the DC voltage from the DC-DC converter unit into AC power. In addition, the power conditioner 4 performs control called MPPT control. The control is a method of constantly tracking the maximum power point according to variation in the generated power of the solar cells 1.
First Power Control Method As described above, in the embodiment of the present disclosure, the DC output of the voltage conversion circuit 8 is controlled such that the AC power which is output from the power conditioner 4 is the predetermined AC power. The configuration is shown in FIG. 2 in more detail. Meanwhile, the switch circuit 3 is omitted in FIG. 2 and the other block diagrams.

A variable output boost circuit 11 corresponding to the voltage conversion circuit 8 is provided. The variable output boost circuit 11 boosts, for example, the output DC voltage of the electrical storage device 2 in a range of 40V to 60V into a range of 80V to 200V.

The output DC voltage of the variable output boost circuit 11 is input to the power conditioner 4. The power conditioner 4 supplies power to the system. The power which is supplied to the system is measured using the power measuring device (power meter) 12. The power measuring device 12 measures present power based on, for example, a current value which is measured using a non-contact current sensor and a voltage value which is measured using a voltage sensor.

The present power information from the power measuring device 12 is provided to a power control microcomputer 13 and a control unit 14. The control unit 14 also includes a microcomputer. For example, present power is displayed on a display apparatus which is provided and related to the control unit 14. The control unit 14 outputs information about target setting power to the power control microcomputer 13.

The power control microcomputer 13 generates a voltage (power) setting control signal based on the present power information and set power information, and supplies the control signal to the variable output boost circuit 11. The DC voltage which is output from the variable output boost circuit 11 is a value in response to the control signal.

Figure 3:
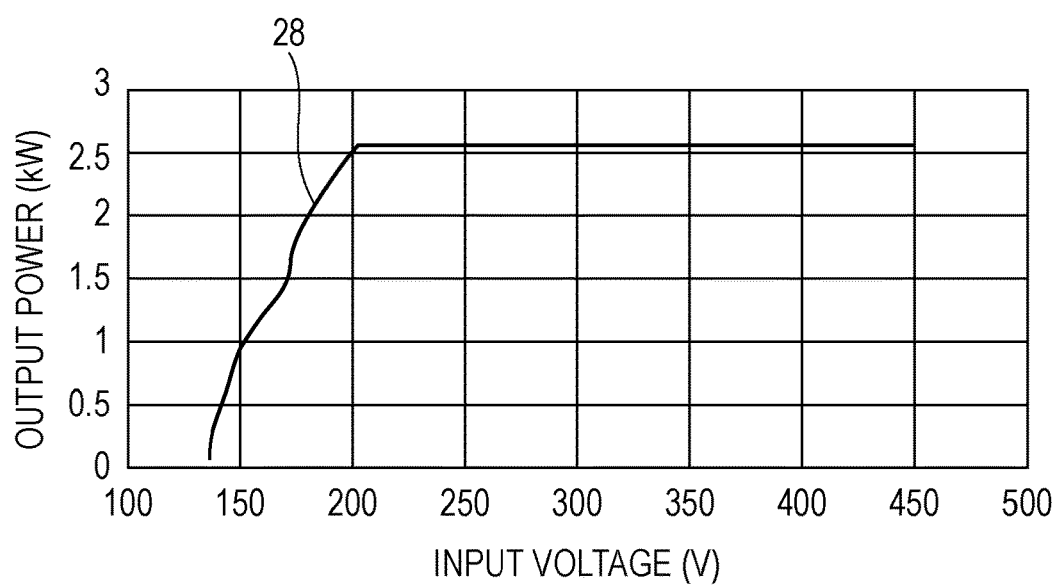
FIG. 3 is an outline diagram illustrating an example of the characteristics of input voltage versus output voltage of a power conditioner in the first example of the power supply system of the present disclosure.

As shown in FIG. 3, since the power conditioner 4 has characteristics such that the output power is changed according to the input DC voltage, the output power according to the output DC voltage of the variable output boost circuit 11 is supplied to the system from the power conditioner 4. In the characteristics 28 (input voltage versus output power) of the power conditioner 4 shown in FIG. 3, the output power increases according to the input voltage in an input voltage range from in the vicinity of 150V to 200V. Therefore, it is possible to perform control such that the output power is an appropriate value by controlling the input voltage value. If the input voltage is equal to or greater than 200V, a limiter acts and causes the output power to be a predetermined output power.

Figure 4:
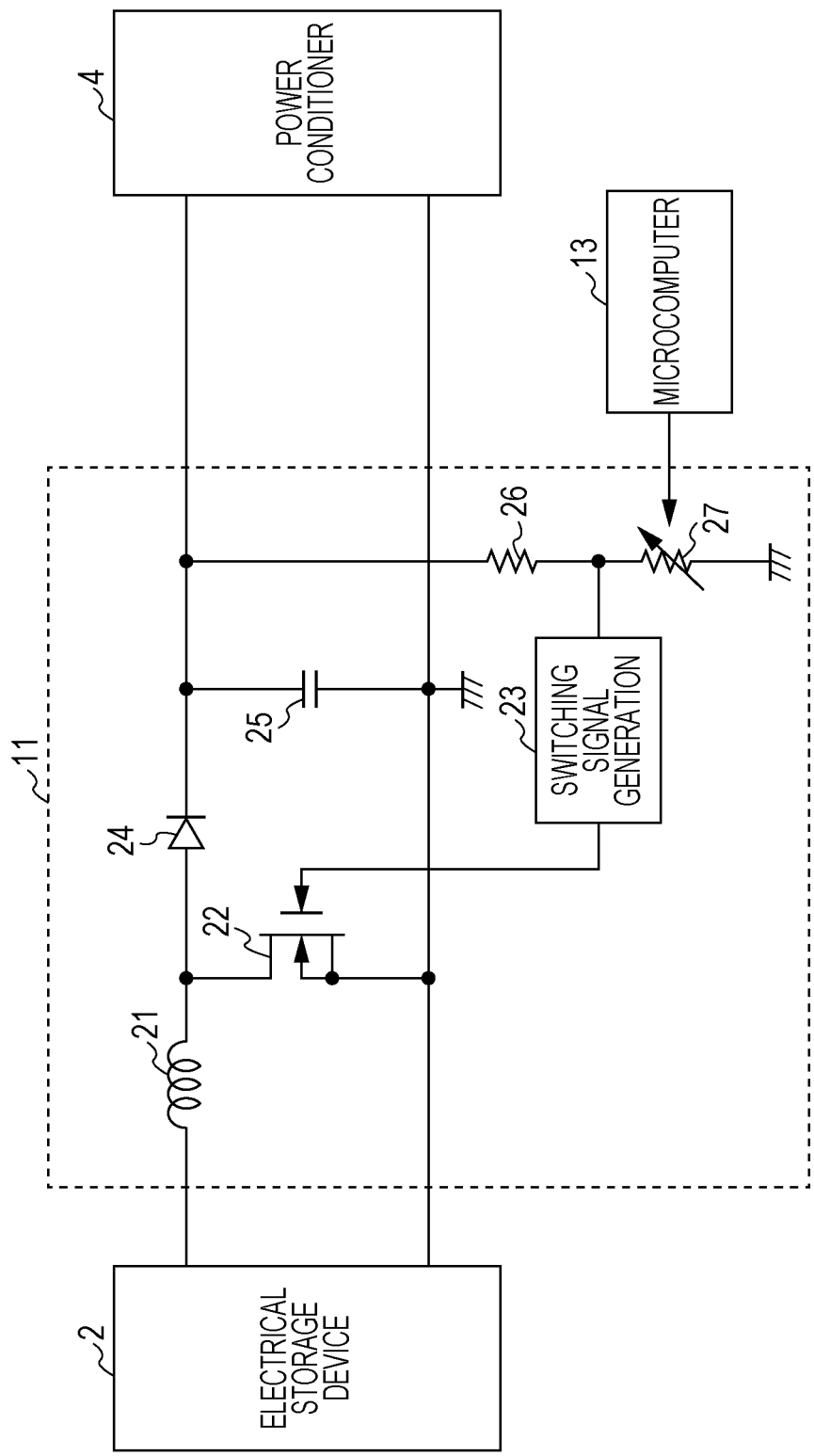
FIG. 4 is a connection diagram illustrating an example of a variable output boost circuit.

FIG. 4 shows an example of the variable output boost circuit 11 (DC-DC converter). An output terminal of one side of the electrical storage device 2 is connected to the drain of a Metal Oxide Semiconductor Field Effect Transistor (MOSFET) 22 through a coil 21. The source of the MOSFET 22 is connected to the output terminal of the other side of the electrical storage device 2. A switching signal from the switching signal generation circuit 23 is supplied to the gate of the MOSFET 22.

The drain of the MOSFET 22 is connected to the input terminal of one side of the power conditioner 4 which functions as a load through a diode 24, and connected to the input terminal of the other side of the power conditioner 4 through a capacitor 25. A both-end voltage of the capacitor 25 is the input DC voltage of the power conditioner 4.

The both-end voltage of the capacitor 25 is supplied to a resistor 26 and the series circuit of a digital potentiometer 27. The resistance value of the digital potentiometer 27 is set in response to the control signal from the power control microcomputer 13. The voltage (feedback voltage) of the connection point between the resistor 26 and the digital potentiometer 27 is supplied to the switching signal generation circuit 23.

A switching signal which is generated using the switching signal generation circuit 23 is a signal, the pulse width of which is modulated, and the output DC voltage varies according to the duty thereof. For example, it is assumed that duty is 50% when the feedback voltage of the connection point between the resistor 26 and the digital potentiometer 27 is equivalent to a reference voltage. If the output voltage is lowered and the voltage of the connection point is lower than the reference voltage, the duty is greater than 50%, a period in which the MOSFET 22 is turned on is long, the output voltage increases, and the output voltage is uniformly maintained. Meanwhile, if the output voltage increases and the feedback voltage is higher than the reference voltage, the duty is lower than 50%, the period in which the MOSFET 22 is turned on is short, the output voltage is lowered, and the output voltage is uniformly maintained.

As described above, when the feedback voltage is equal to the reference voltage, a constant voltage function is provided to generate a predetermined output voltage. Therefore, if the resistance value of the digital potentiometer 27 is changed to a smaller value, the feedback voltage is not equal to the reference voltage unless the output voltage is higher than the output voltage obtained before the change, thus it is possible to change the output voltage to a higher voltage. Meanwhile, if the resistance value of the digital potentiometer 27 is changed to a greater value, the feedback voltage is not equal to the reference voltage unless the output voltage is lower than the output voltage obtained before the change, thus it is possible to change the output voltage to a lower voltage. It is possible to change the output voltage by controlling the resistance value of the digital potentiometer 27 as described above.

Since the resistance value of the digital potentiometer 27 is changed using the power control microcomputer 13, it is possible to change the output voltage of the variable output boost circuit 11 using the power control microcomputer 13. Therefore, it is possible to change the power, which is supplied from the power conditioner 4 to the system, using the power control microcomputer 13. Meanwhile, the detailed configuration of the variable output boost circuit 11 shown in FIG. 4 is a mere example, and it is possible to use configurations, such as a down-type or step-up/down type DC-DC converter, a DC-DC converter in which a primary side is insulated from a secondary side, and the like.

In the present disclosure, as a control performed on the variable output boost circuit 11, an open-loop control method in which information about target setting power is assigned may be used. In the configuration of FIG. 2, a feedback loop which includes the power control microcomputer 13 is provided. It is possible to compensate for the loss of the power conditioner 4 or the environmental change for the loss (variation attributable to temperature or the like) by providing the feedback loop. The power control microcomputer 13 forms a voltage setting control signal using the present power information and the set power information.

Figure 5:
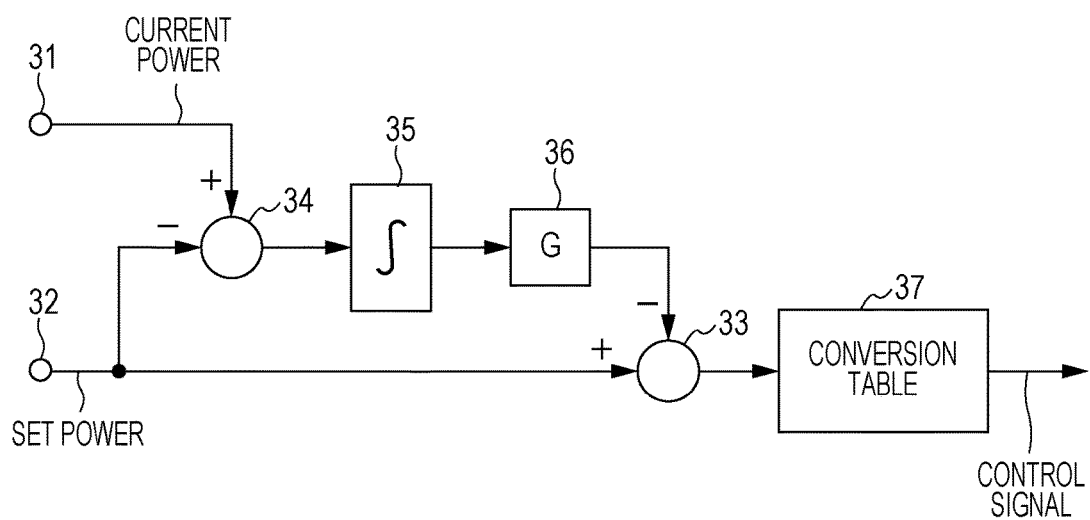
FIG. 5 is a block diagram illustrating the function of a microcomputer in the first example of the power supply system of the present disclosure.

FIG. 5 shows a functional block diagram illustrating a process performed using the power control microcomputer 13. The present power information from the power measuring device 12 is supplied to an input terminal 31. The set power information is supplied to an input terminal 32. The set power information is supplied to a subtracter 33 and a subtracter 34.

The subtracter 34 calculates errors by subtracting the set power information from the present power information. The errors are integrated using an integrator 35, and the output of the integrator 35 is supplied to an error gain circuit 36. The error gain circuit 36 multiplies gains for the errors (a value which is much smaller than 1). The output of the error gain circuit 36 is supplied to the subtracter 33.

The output of the subtracter 33 is supplied to a conversion table 37. The conversion table 37 is a table which includes digital data used to convert a power value into the voltage value setting control signal. The table is created based on the characteristics of the power conditioner 4, and is stored in a nonvolatile memory. The table is created based on the power conditioner 4 which is being used. The voltage value setting control signal is a signal which is used to control the resistance value of the digital potentiometer 27 in the configuration shown in FIG. 4. When the power conditioner 4 includes, for example, the characteristics (input DC voltage versus output power) as shown in FIG. 3, the conversion table 37 assumes a case of the relationship of "output power versus input voltage setting control signal" based on the characteristics.

For example, in the characteristics of the power conditioner 4, there is a relationship in which the output power is the set power when the output power is the reference voltage at almost center of a range which increases according to the input voltage. In a case in which there are not errors, the variable output boost circuit 11 inputs the reference voltage to the power conditioner 4 in response to the control signal which is output from the conversion table 37. Meanwhile, attributable to errors which are generated when the present power is higher than the set power, a control signal, which is used to lower the DC voltage output from the variable output boost circuit 11, is generated from the conversion table 37. In addition, attributable to errors which are generated when the present power is lower than the set power, a control signal, which is used to raise the DC voltage output from the variable output boost circuit 11, is generated from the conversion table 37. According to the above-described control, it is possible to control such that the output power of the power conditioner 4 is the set power. Furthermore, the voltage conversion circuit 8 and the variable output boost circuit 11 may be provided in the power conditioner 4.

Second Power Control Method

A second power control method will be described below. The second method is used to generate an input DC voltage with respect to the power conditioner 4 using a DC power source (hereinafter, referred to as a pseudo PV power source for convenience) which performs an operation which is modeled on the solar cells. The reason for the configuration of the pseudo PV power source is that all existing power conditioners for solar cells PV are for the output of the solar cells. If a power conditioner with respect to the output of a generating device other than the solar cells, for example, wind power generation, is used, a power source which performs an operation which is modeled on the wind power generation is configured.

Figure 6:
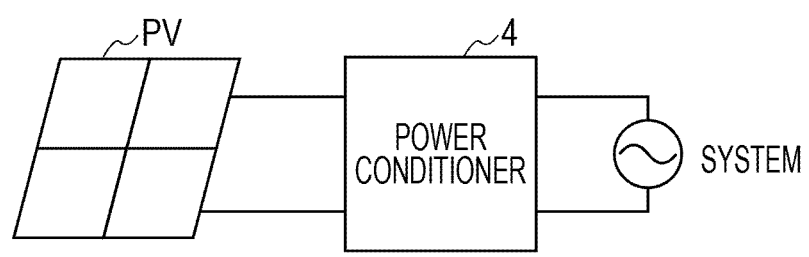
FIG. 6 is a block diagram illustrating a second example of the power supply system of the present disclosure.
Figure 7:
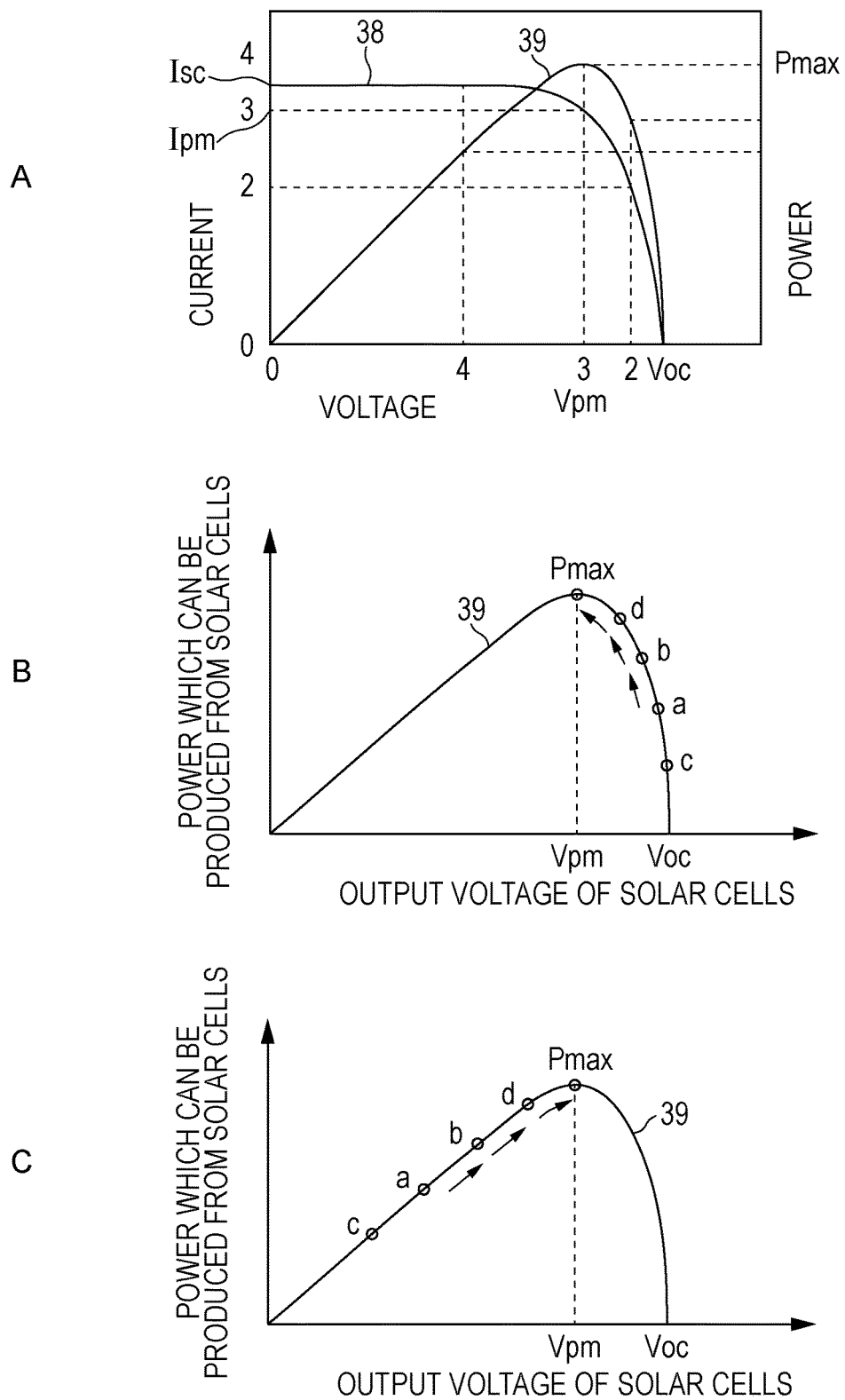
FIGS. 7A to 7C are outline diagrams illustrating a second example of the power supply system of the present disclosure.

For the comprehension of the second method, as shown in FIG. 6, an operation of the power conditioner 4 which is connected to the solar cells PV will be described. The output characteristics of the solar cells PV are displayed using an I-V curve (current-voltage curve) 38 as shown in FIG. 7A. A voltage which is obtained when an output is open is called an open voltage Voc. A current which is obtained when the output is short-circuited is called a short-circuited current Isc. The open voltage Voc and the short-circuited current Isc are the maximum voltage and the maximum current of the solar cells PV. The I-V curve 38 of the solar cells PV varies depending on external environments, such as the amount of solar radiation, temperature, and the like, and the open voltage Voc and the short-circuited current Isc are not constant.

The I-V curve 38 indicates that a voltage decreases if a current, which is output according to load, increases. Since the output power of the open voltage Voc and the short-circuited current Isc are 0, there is the maximum power point when the current value is between 0 and Isc. A P-V curve (power-voltage curve) 39 indicates the maximum power point. In the output voltage Vpm, the P-V curve 39 is the maximum (maximum power point Pmax). That is, if the output voltage is caused to be Vpm, power which is produced from the solar cells PV is the maximum.

The power conditioner 4 is a device which outputs the power of the solar cells PV to a power system. At the time of normal operation, the power conditioner 4 operates such that the power which is produced from the solar cells PV (that is, the power which can be output to the power system) is the maximum (maximum power point tracking control).

When a voltage at an operating point is higher than the maximum power point voltage and the operating point is a as shown in FIG. 7B, an adjacent operating point b is compared with an operating point c, and the current value is changed such that the current value moves in the direction in which the output power is high. The operating point is determined using, for example, a load current. Subsequently, an operating point d is compared with the operating point a, which are adjacent to the operating point b, and the current value is changed such that the current value moves in the direction in which the output power is high. The current value finally reaches the maximum power point Pmax by repeating this operation. Meanwhile, when the voltage of the operating point is lower than the maximum power point voltage, control is performed such that maximum power point Pmax is tracked as shown in FIG. 7C.

Figure 8:
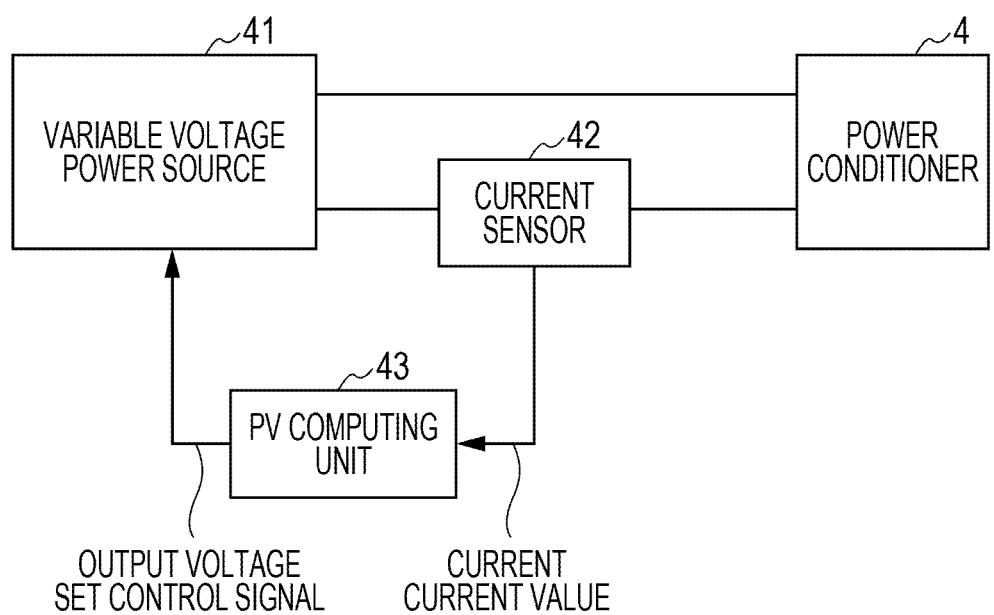
FIG. 8 is a block diagram illustrating pseudo PV power source in the second example of the power supply system of the present disclosure.

FIG. 8 shows an example of a pseudo PV power source which has the same characteristics as the above-described solar cells PV. The output DC voltage of a variable voltage power source 41 is input to the power conditioner 4. The variable voltage power source 41 includes, for example, an electrical storage device and a variable voltage output circuit as described later. The output power of the power conditioner 4 is supplied to the system. The output current of the variable voltage power source 41 (the load current of the power conditioner 4) is detected using a current sensor 42. A contactless sensor can be used as the current sensor 42.

A present current value which is detected using the current sensor 42 is supplied to a PV computing unit 43. The PV computing unit 43 includes a current-output voltage setting control signal conversion table used to implement an I-V curve which is the same as the I-V curve 38 of the solar cells PV as shown in FIG. 7A. In detail, the PV computing unit 43 is implemented using a microcomputer or the like which includes a table.

If the present current value is input to the PV computing unit 43, a voltage value corresponding to the current value of the I-V curve is obtained, and a control signal which is used to output the voltage value is output from the PV computing unit 43. The control signal is supplied to the variable voltage power source 41, and the output voltage value of the variable voltage power source 41 is set to the voltage value on the I-V curve. The variable voltage power source 41 includes, for example, a DC-DC converter as the same as the above-described variable output boost circuit 11. The pseudo PV power source is configured as described above.

The output current of the pseudo PV power source and the output voltage is input to the power conditioner 4, and the current value is changed, thus the power conditioner 4 performs the above-described maximum power point tracking control operation, thereby performing control such that the maximum power point Pmax is tracked. That is, finally, the DC voltage Vpm, which is used to output the maximum power point Pmax, is supplied from the variable voltage power source 41 to the power conditioner 4. Meanwhile, the example of the above-described pseudo PV power source is configured such that the output current is detected and the predetermined DC voltage is output. In contrast, the output voltage may be detected and then the predetermined output current may be generated.

The present disclosure controls the output power of the power conditioner 4. In order to perform this control, it is necessary to change a maximum power value which is supplied from the pseudo PV power source to the power conditioner 4. Since the power conditioner 4 assumes an input from the solar cells PV, it is preferable that the change of the maximum power value be performed as the same as the solar cells PV.

Figure 9:
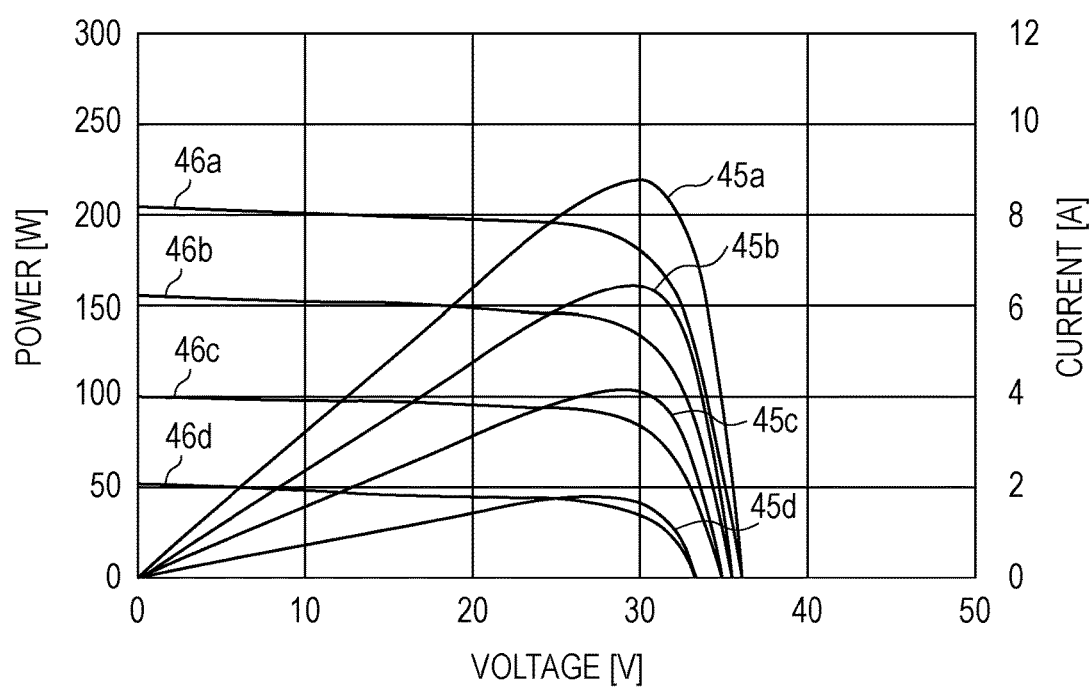
FIG. 9 is an outline diagram illustrating the second example of the power supply system of the present disclosure.

As shown in FIG. 9, the maximum power value of the solar cells PV varies according to solar radiation intensity. A P-V curve (power-voltage curve) 45a and an I-V curve (current-voltage curve) 46a are obtained when the solar radiation intensity is strong, for example, when the solar radiation intensity is 1000 W/m$^2$. A P-V curve 45b and an I-V curve 46b are obtained when the solar radiation intensity is rather strong, for example, when the solar radiation intensity is 750 W/m$^2$. A P-V curve 45c and an I-V curve 46c are obtained when the solar radiation intensity is rather weak, for example, when the solar radiation intensity is 500 W/m$^2$. A P-V curve 45d and an I-V curve 46d are obtained when the solar radiation intensity is weak, for example, when the solar radiation intensity is 250 W/m$^2$.

As shown in FIG. 9, it is understood that the variation of the amount of solar radiation is exhibited as the variation of the maximum current. In addition, it may be regarded that the voltage of the maximum power point which is on the top of the P-V curve hardly varies, and only variation in current varies the power value of the maximum power point.

Since (power=voltage×current), current is proportional to power if voltage is uniform. Since the current value of the maximum power point is proportional to maximum current, the maximum current is proportional to the maximum power. That is, the maximum power is proportional to the maximum current, the power conditioner 4 understands the variation in the maximum current as the variation in the amount of solar radiation.

Since the power conditioner 4 operates using the maximum power of the solar cells PV, the power conditioner 4 operates at the maximum power points of the respective variations in the I-V curves based on the amount of solar radiation. Therefore, the relationship of the following equation is realized.

(power output from power conditioner≈input power of the power conditioner=maximum power point power∝maximum current)

Based on this relationship, it is understood that the output power of the power conditioner 4 is proportional to the maximum current of the solar cells PV. The output power of the power conditioner can be controlled by controlling the maximum current.

In order to implement the pseudo PV power source having variable output based on the above-described point, the I-V curves are created by performing a software process (computing process) because there is limitation in the number of realizable I-V curves in a method of storing a table of a plurality of the I-V curves. That is, a desired I-V curve can be created by applying the maximum current value.

Figure 10:
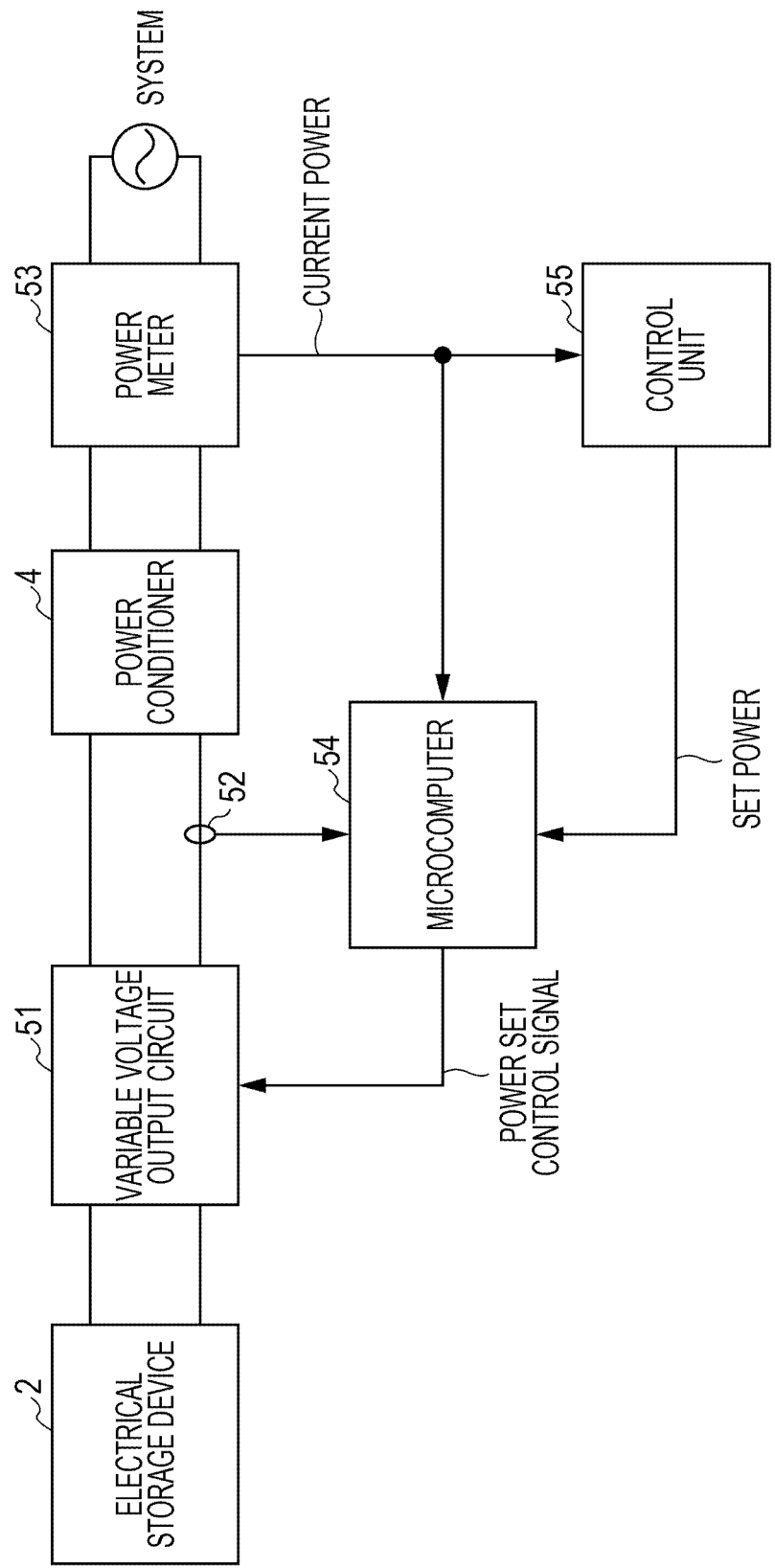
FIG. 10 is a block diagram illustrating the second example of the power supply system of the present disclosure.

The above-described second control method is implemented based on, for example, a configuration shown in FIG. 10. The output of the electrical storage device 2 is supplied to a variable voltage output circuit 51. The variable voltage output circuit 51 is a voltage conversion circuit which can varies the output voltage as the variable voltage power source 41 shown in FIG. 8. The output of the variable voltage output circuit 51 is supplied to the power conditioner 4. The output DC current of the variable voltage output circuit 51 (the present load current of the power conditioner 4) is detected using the current sensor 52.

The power conditioner 4 supplies power to the system. The power which is supplied to the system is measured using a power measuring device (power meter) 53. The power measuring device 53 measures a present power using, for example, a current value which is measured using the non-contact current sensor, and a voltage value, which is measured using the voltage sensor.

A present DC current value from the current sensor 52 and present power information from the power measuring device 53 are supplied to a power control microcomputer 54 and a control unit 55, respectively. A control unit 55 is configured using a microcomputer. For example, present power is displayed on a display device which is provided in association with a control unit 55. The control unit 55 outputs information about the target setting power to the power control microcomputer 54.

The power control microcomputer 54 calculates a power value for control based on the present power information and the set power information, converts the power value for control into a maximum current value, calculates an I-V curve corresponding to the maximum current value, and generates a control signal, which is used to set an output voltage value, based on the I-V curve and the present DC current value. The voltage (power) setting control signal is supplied to the variable voltage output circuit 51. The voltage which is output from the variable voltage output circuit 51 is a value in response to the control signal.

Figure 11:
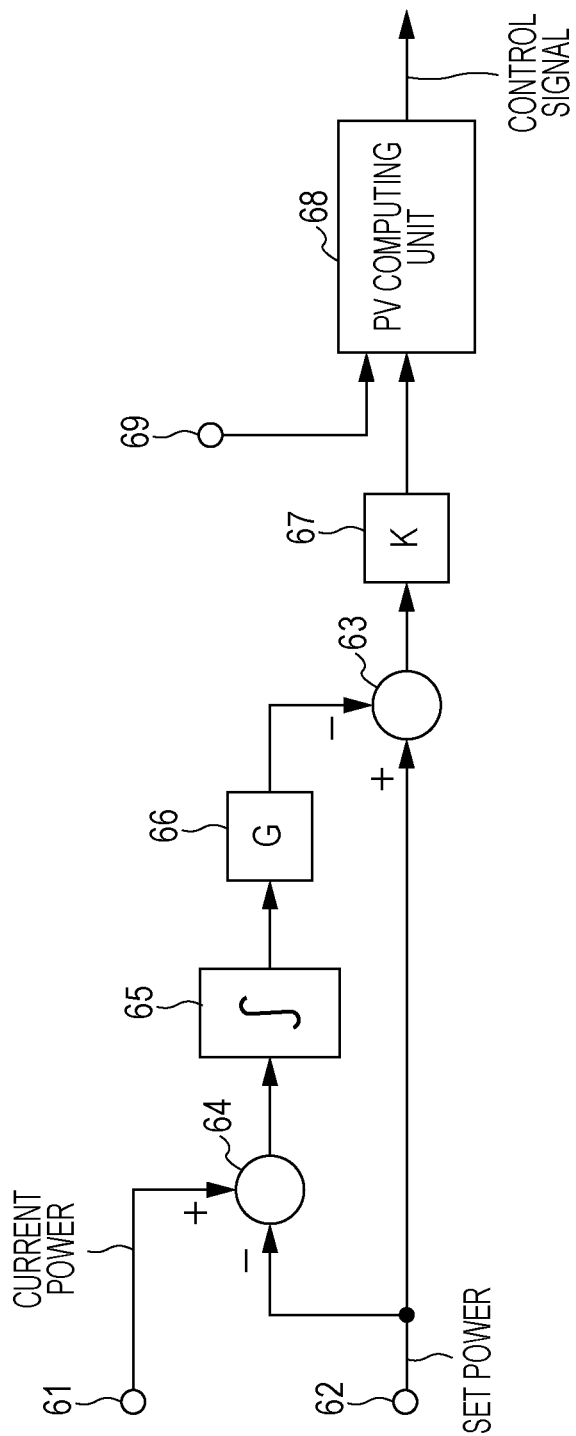
FIG. 11 is a block diagram illustrating the function of a microcomputer in the second example of the power supply system of the present disclosure.

In the configuration shown in FIG. 10, it is possible to compensate for the loss of the power conditioner 4 using a feedback loop which includes the power control microcomputer 54, thus it is possible to perform highly accurate control. FIG. 11 is a functional block diagram illustrating the process performed using the power control microcomputer 54. The present power information from the power measuring device 53 is supplied to an input terminal 61. Set power information is supplied to an input terminal 62. The set power information is supplied to a subtracter 63 and a subtracter 64.

The subtracter 64 calculates errors by subtracting the set power information from the present power information. The errors are integrated using an integrator 65, and the output of the integrator 65 is supplied to an error gain circuit 66. The error gain circuit 66 multiplies gains for the errors (a value which is much smaller than 1). The output of the error gain circuit 66 is supplied to the subtracter 63.

The output of the subtracter 63 corresponds to a power value for control. The power value for control is supplied to a multiplication circuit 67 which multiplies by a constant K. The constant K is a power current conversion constant, and is used to convert the power value for control into the maximum current of the pseudo PV power source. The constant K is expressed using the following Equation.

$K=$(the maximum current of currently simulated solar cells $PV$/the maximum power of currently simulated solar cells $PV$)

The output of the multiplication circuit 67 is input to a PV computing unit 68 as the maximum current value. The PV computing unit 68 creates an I-V curve corresponding to the maximum current value by performing a software process. The DC current value (load current value) which is detected from a terminal 69 is supplied to the PV computing unit 68, and a voltage value corresponding to the DC current value is obtained. Thereafter, a control signal, which causes the variable voltage output circuit 51 to output the obtained voltage value, is output from the PV computing unit 68. The control signal is supplied to the variable voltage output circuit 51.

Since the power conditioner 4 performs the maximum power point tracking control operation, the current value varies. As described above, the voltage value varies according to the varied current value, the power which is finally input to the power conditioner 4 is the maximum power, and the output power of the power conditioner 4 is also the maximum power. The maximum power corresponds to the set power.

The above-described second control method has general-purpose properties that can be widely applied to the existing power conditioner. The configuration of the described first control method is simple. On the other hand, it is necessary to create a table for each power conditioner to be used.

Meanwhile, the present disclosure can include configurations below.

(1) A power supply system includes: an electrical storage device that includes a plurality of electrical storage elements; a voltage or current conversion unit that is connected to the electrical storage device; and a power control unit to which a Direct Current (DC) output of the conversion unit is supplied, and that generates an Alternating-Current (AC) power. The DC output of the conversion unit is controlled such that the AC power, which is output from the power control unit, is a predetermined AC power.

(2) In the power supply system of (1), the power control unit is a power conditioner, and the output AC power of the power conditioner is supplied to a system.

(3) In the power supply system of (1) or (2), the power control unit has characteristics in that the output power is changed according to an input voltage.

(4) In the power supply system of any one of (1), (2), and (3), the conversion unit converts the DC voltage from the electrical storage device into a DC output voltage having a different value based on input/output characteristics of the power control unit, and the power control unit outputs the predetermined AC power according to the DC output voltage.

(5) In the power supply system of any one of (1), (2), (3), and (4), the conversion unit has current-voltage output characteristics which are same as or similar to those of solar cells.

(6) In the power supply system of any one of (1), (2), (3), (4), and (5), the power control unit has a maximum power point tracking control function, obtains a maximum power point corresponding to the predetermined AC power, and outputs the predetermined AC power according to the current-voltage output characteristics which correspond to the obtained maximum power point.

(7) The power supply system of any one of (1), (2), (3), (4), (5), and (6), further includes: an output detection unit that detects the DC output of the conversion unit; a storage unit that stores current-voltage output characteristics which are same as or similar to those of solar cells; and an output control unit that changes the output of the conversion unit according to detection results, which are obtained using the output detection unit, and current-voltage output characteristics. The power control unit generates the AC power by performing maximum power point tracking control on the DC output of the conversion unit.

(8) In the power supply system of any one of (1), (2), (3), (4), (5), (6), and (7), a voltage value, which is output from the conversion unit, is obtained by applying a present output current value to created current-voltage output characteristics.

(9) The power supply system of any one of (1), (2), (3), (4), (5), (6), (7), and (8) further includes a control circuit unit that controls the power control unit and the conversion unit.

(10) In the power supply system of any one of (1), (2), (3), (4), (5), (6), (7), (8), and (9) further includes: a power detection unit that detects an output power of the power control unit; and a feedback system to which the detection results obtained using the power detection unit is input, and that changes the output of the conversion unit based on the input detection results.

(11) A power source apparatus includes: an electrical storage device that includes a plurality of electrical storage elements; and a voltage or current conversion unit that is connected to the electrical storage device, a DC output of the conversion unit is supplied to a power control unit, and the DC output of the conversion unit is controlled.

(12) In the power source apparatus of (11), the conversion unit converts a DC voltage from the electrical storage device into a DC output voltage having a different value based on input/output characteristics of the power control unit.

(13) In the power source apparatus of any one of (11) and (12), the conversion unit has current-voltage output characteristics which are the same as or similar to those of solar cells.

(14) In the power source apparatus of any one of (11), (12), and (13), a voltage value, which is output from the conversion unit, is obtained by applying a present output current value to created current-voltage output characteristics.

(15) A power supply system comprising: an electrical storage device; a power conversion circuit configured to convert a power from the electrical storage device into converted DC power; and a power control unit configured to receive the converted DC power and output AC power, wherein the converted DC power is controlled such that the output AC power is a predetermined AC power.

(16) A power supply system according to (15), wherein the power control unit is a power conditioner.

(17) A power supply system according to any one of (15) and (16), wherein the converted DC power is controlled based on characteristics of the power control unit.

(18) A power supply system according to (17), wherein the characteristics of the power control unit include the output AC power changing according to an inputted voltage.

(19) A power supply system according to any one of (17) and (18), wherein the characteristics of the power control unit include the output AC power increasing as an inputted voltage increases.

(20) A power supply system according to (19), wherein the characteristics of the power control unit include the output AC power being limited to a maximum output power.

(21) A power supply system according to any one of (17), (18), (19), and (20), wherein the characteristics of the power control unit include performing Maximum Power Point Tracking (MPPT) control.

(22) A power supply system according to any one of (15), (16), (17), (18), (19), (20), and (21), wherein the power conversion circuit outputs the converted DC power similar to power output from solar cells.

(23) A power supply system according to any one of (15), (16), (17), (18), (19), (20), (21), and (22), further comprising: a power detection unit configured to detect information related to the output AC power; and a feedback circuit configured to receive the detected information and control the converted DC power based on the detected information.

(24) A power supply apparatus comprising: an electrical storage device; and a power conversion circuit configured to convert a power from the electrical storage device into converted DC power, and configured to supply the converted DC power to a power control unit that outputs AC power, wherein the converted DC power is controlled such that the output AC power is a predetermined AC power.

(25) A power supply apparatus according to (24), wherein the power control unit is a power conditioner.

(26) A power supply apparatus according to any one of (24) and (25), wherein the converted DC power is controlled based on characteristics of the power control unit.

(27) A power supply apparatus according to (26), wherein the characteristics of the power control unit include the output AC power changing according to an inputted voltage.

(28) A power supply apparatus according to any one of (26) and (27), wherein the characteristics of the power control unit include the output AC power increasing as an inputted voltage increases.

(29) A power supply apparatus according to (28), wherein the characteristics of the power control unit include the output AC power being limited to a maximum output power.

(30) A power supply apparatus according to any one of (26), (27), (28), and (29), wherein the characteristics of the power control unit include performing Maximum Power Point Tracking (MPPT) control.

(31) A power supply apparatus according to any one of (24), (25), (26), (27), (28), (29), and (30), wherein the power conversion circuit supplies the converted DC power similar to power output from solar cells.

MODIFICATION EXAMPLE

Hereinbefore, although the embodiments of the present disclosure have been described in detail, the present disclosure is not limited to each of the above-described embodiments and various types of modifications are possible based on the technical spirit of the present disclosure. For example, configurations, methods, processes, shapes, materials and numerical values described in the above-described embodiments are just examples, and other configurations, methods, processes, shapes, materials and numerical values may be used as necessary.

In addition, the configurations, methods, processes, shapes, materials and numerical values of the above-described embodiments can be combined with each other without departing from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 solar cells
2 electrical storage device
4 power conditioner
11 variable output boost circuit
12 power measuring device
13 power control microcomputer
14 control unit
37 conversion table
41 variable voltage power source
42 current sensor
43 PV computing unit
51 variable voltage output circuit
52 current detection sensor
54 power control microcomputer
55 control unit

The invention claimed is:

1. A power supply system, comprising:
an electrical storage device;
a power conversion circuit configured to convert a first DC power from the electrical storage device into a second DC power; and
a power control unit configured to:
  receive the second DC power;
  output an AC power;
  receive an output AC power value;
  determine a difference between the output AC power value and a determined AC power value;
  set a resistance value based on the determined difference between the output AC power value and the determined AC power value such; and
  control the second DC power based on the resistance value such that the outputted AC power is equivalent to a determined AC power.

2. The power supply system according to claim 1, wherein the power control unit is a power conditioner.

3. The power supply system according to claim 1, wherein the the power control unit is further configured to control the second DC power based on characteristics of the power control unit.

4. The power supply system according to claim 3, wherein the characteristics of the power control unit include change in the outputted AC power based on an input voltage.

5. The power supply system according to claim 3, wherein the characteristics of the power control unit include an increase in the outputted AC power as an input voltage increases.

6. The power supply system according to claim 5, wherein the characteristics of the power control unit include a maximum output power as a limit to the outputted AC power.

7. The power supply system according to claim 3, wherein the characteristics of the power control unit include Maximum Power Point Tracking (MPPT) control.

8. The power supply system according to claim 1, wherein the power conversion circuit is further configured to have output characteristics same as output characteristics of solar cells.

9. The power supply system according to claim 1, further comprising:

a power detection unit configured to detect information related to the determined difference between the output AC power value and the determined AC power value; and a feedback circuit configured to receive the detected information and control the second DC power based on the detected information.

10. The power supply system according to claim 1, wherein a pulse width of a signal, that controls the second DC power, is modulated based on the determined difference between the output AC power value and the determined AC power value.

11. The power supply system according to claim 1, further comprising a limiter configured to control the second DC power based on an input DC voltage that is equal to or greater than a threshold voltage.

12. The power supply system according to claim 1, further comprising:
   a switching signal generation unit configured to generate a switching signal, and
   wherein the power conversion circuit is further configured to control the second DC power based on the switching signal.

13. A power supply apparatus, comprising:
   an electrical storage device; and
   a power conversion circuit configured to:
      convert a first DC power from the electrical storage device into a second DC power; and
      supply the second DC power to a power control unit configured to output an AC power,
   wherein the power control unit is further configured to:
      receive an output AC power value;
      determine a difference between the output AC power value and a determined AC power value;
      set a resistance value based on the determined difference between the output AC power value and the determined AC power value; and
      control the second DC power based on the resistance value such that the outputted AC power is equivalent to a determined AC power.

14. The power supply apparatus according to claim 13, wherein the power control unit is a power conditioner.

15. The power supply apparatus according to claim 13, wherein the power control unit is further configured to control the second DC power based on characteristics of the power control unit.

16. The power supply apparatus according to claim 15, wherein the characteristics of the power control unit include change in the outputted AC power based on an input voltage.

17. The power supply apparatus according to claim 15, wherein the characteristics of the power control unit include an increase in the outputted AC power as an input voltage increases.

18. The power supply apparatus according to claim 17, wherein the characteristics of the power control unit include a maximum output power as a limit to the outputted AC power.

19. The power supply apparatus according to claim 15, wherein the characteristics of the power control unit include Maximum Power Point Tracking (MPPT) control.

20. The power supply apparatus according to claim 13, wherein the power conversion circuit is further configured to have output characteristics same as output characteristics of solar cells.

* * * * *